US011972938B2

(12) United States Patent
Stewart et al.

(10) Patent No.: US 11,972,938 B2
(45) Date of Patent: Apr. 30, 2024

(54) VOLTAGE SUPPLY FOR A MASS ANALYSER

(71) Applicant: Thermo Fisher Scientific (Bremen) GmbH, Bremen (DE)

(72) Inventors: Hamish Stewart, Bremen (DE); Dmitry Grinfeld, Bremen (DE); Philipp Cochems, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 17/661,331

(22) Filed: Apr. 29, 2022

(65) Prior Publication Data

US 2022/0392759 A1 Dec. 8, 2022

(30) Foreign Application Priority Data

Jun. 2, 2021 (GB) ...................................... 2107895

(51) Int. Cl.
*H01J 49/40* (2006.01)
*H01J 49/06* (2006.01)

(52) U.S. Cl.
CPC .............. *H01J 49/40* (2013.01); *H01J 49/06* (2013.01)

(58) Field of Classification Search
CPC .......... H01J 49/40; H01J 49/06; H01J 49/405; H01J 49/022; H01J 49/406; H01J 49/425
USPC .......................................................... 250/287
See application file for complete search history.

(56) References Cited

U.S. PATENT DOCUMENTS

2012/0073390 A1* 3/2012 Zaghloul .............. G01N 29/022 310/313 D

FOREIGN PATENT DOCUMENTS

| | | | |
|---|---|---|---|
| GB | 2582869 | A | 10/2020 |
| GB | 2591297 | A | 7/2021 |
| JP | H03129656 | A | 6/1991 |

OTHER PUBLICATIONS

GB2107895.1, Search Report, Nov. 10, 2021, 4 pp.

* cited by examiner

*Primary Examiner* — Kiet T Nguyen
(74) *Attorney, Agent, or Firm* — William R McCarthy, III

(57) ABSTRACT

A voltage supply for a mass analyser is provided. The voltage supply comprises a voltage source, a first voltage output, a second voltage output, and a voltage divider network. The first voltage output is configured to provide a first voltage to a first electrode of the mass analyser, wherein the first electrode of the mass analyser has a first mass shift per volt perturbation. The second voltage output is configured to provide a second voltage to a second electrode of the mass analyser, wherein the second electrode of the mass analyser has a second mass shift per volt perturbation. The second mass shift per volt perturbation opposes the first mass shift per volt perturbation. The voltage divider network comprises a first resistor and a second resistor.

20 Claims, 5 Drawing Sheets

VOLTAGE SUPPLY FOR A MASS ANALYSER

CROSS-REFERENCE TO RELATED APPLICATIONS

The present application claims priority benefit under one or more of 35 U.S.C. 119(a)-119(d) of GB Patent Application No. 2107895.1 filed Jun. 2, 2021, which disclosures are herein incorporated by reference in their entirety.

FIELD OF THE DISCLOSURE

The present disclosure relates to a mass analyser. In particular, the present disclosure relates to a power supply for a mass analyser.

BACKGROUND

Commercial high-resolution accurate mass analysers are typically required to measure mass to within a few ppm of the true value, and sub-ppm is highly advantageous. With an external calibration, accurate mass measurement depends on mV level stability of high voltage power supplies over the time period from when the calibration was made. For such power supplies, there are two main forms of voltage supply instability which can affect the accuracy of measurements made with a mass analyser: jitter and power supply drift.

Jitter

Power supply jitter occurs due to instabilities in the voltage supply at around or above the frequency of the analyser acquisition. Time-of-flight analysers operate between 10 Hz and 30,000 Hz, with ion flight times varying from tens of microseconds to milliseconds. Time-averaging spectra can reduce the impact of power supply instabilities with frequency greater than the rate of averaging. Such time-averaging processes usually deliver averaged spectra at 10-200 Hz. However jitter at the averaging frequency or lower will not be compensated by such techniques.

Resolution of averaged ToF spectra will also be impaired if jitter is substantial in frequencies corresponding to the averaging frequency or below. At very high frequencies (MHz+), noise may be averaged over the time ions spend at individual elements of the analyser and the effect on mass accuracy and resolution much reduced.

To counteract some of the effects of power supply jitter, it is known to filter the voltage supply. Active or passive low pass filters are conventionally used to remove higher frequency ripple. Generally suppressing such instability comes at the cost of additional resistors and high voltage capacitors, with consequence to power, safety or the implementation of features such as polarity switching. Additionally, such filters do not address any noise that may be still be induced between the filter and the electrodes.

Power Supply Drift

Power supplies also drift over time as a consequence of low frequency noise sources and changes in local temperature. Upon warm up a power supply might drift by hundreds of ppm before reaching equilibrium, and typically drift by tens of ppm per degree change in the surroundings.

One known technique to counteract the effects of temperature drift on a mass analyser is to control the temperature of the full instrument (which also benefits mass error caused by thermal expansion of the analyser), the entire power supply, or to control the temperature of critical components. For example, “On the Accurate Understanding of Mass Measurement Accuracy in Q-TOF MS”, Atsuhiko Toyama, White Paper, 6 Apr. 2019, discloses a Time of Flight mass analyser having improved management of flight tube temperature. The flight tube includes a black nickel plating on the flight tube housing for maximising heat radiation.

Against this background, it is an object of this disclosure to provide an improved, or at least commercially relevant alternative, power supply or mass analyser.

SUMMARY

According to a first aspect of the disclosure, a voltage supply for a mass analyser is provided. The voltage supply comprises a voltage source, a first voltage output, a second voltage output, and a voltage divider network. The first voltage output is configured to provide a first voltage to a first electrode of the mass analyser, the first electrode of the mass analyser having a first mass shift per volt perturbation. The second voltage output is configured to provide a second voltage to a second electrode of the mass analyser, the second electrode of the mass analyser having a second mass shift per volt perturbation. The second mass shift per volt perturbation opposes the first mass shift per volt perturbation. The voltage divider network is connected to the voltage source, the first voltage output, and the second voltage output. The voltage divider network comprises a first resistor and a second resistor. The first resistor is configured to define the first voltage, the first resistor having a first temperature coefficient. The second resistor is configured to define the second voltage, the second resistor having a second temperature coefficient. The second temperature coefficient is selected based on the first and second mass shift per volt perturbations and the first temperature coefficient such that a first mass shift associated with the first electrode is compensated by a second mass shift associated with the second electrode.

The voltage supply according to the first aspect provides first and second voltages to first and second electrodes respectively of a mass analyser. Perturbations in the voltages applied to these electrodes can result in a shift in the mass of an ion detected by the mass analyser. It will be appreciated that depending on the geometry of the mass analyser/electrode, the relationship between the mass shift and voltage perturbation (i.e. the mass shift per volt perturbation) can be positive or negative. For the power supply of the first aspect, a change in the temperature of the voltage supply will cause a change in the resistances of the first and second resistors in the voltage divider network. This in turn will cause a change in the voltages output by the voltage supply, and thus result in a shift in the mass detected by the mass analyser.

The first and second resistors of the first aspect have specified temperature coefficients. The temperature coefficient of each resistor selected will determine the amount of mass shift in the mass analyser per degree Kelvin variation in temperature. According to the first aspect, the temperature coefficients are selected such that a first mass shift associated with first electrode is compensated by an opposing second mass shift associated with the second electrode. That is to say, rather than simply selecting first and second resistors with the lowest temperature coefficients to minimise resistance drift in the voltage supply, one or more resistors may intentionally be selected with a higher temperature coefficient such that the overall mass shift of the mass analyser per degree Kelvin is reduced.

While the voltage supply of the first aspect is directed to a voltage supply comprising two voltage outputs, it will be appreciated that in some embodiments the voltage supply may include a plurality of voltage outputs. For example, the voltage supply may include at least three, four, or five voltage outputs for connection to a respective electrode of a mass analyser. As each electrode of said mass analyser has an associated mass shift per volt perturbation relationship, the resistors of the voltage divider network can be selected with suitable temperature coefficients in order to reduce the overall mass shift per degree Kelvin temperature variation following the principle of the first aspect.

According to a second aspect of the disclosure, a voltage supply for a mass analyser is provided. The voltage supply comprises a voltage source, a first voltage output, a second voltage output, and a voltage divider network. The first voltage output is configured to provide a first voltage to a first electrode of the mass analyser, the first electrode of the mass analyser having a first mass shift per volt perturbation. The second voltage output is configured to provide a second voltage to a second electrode of the mass analyser, the second electrode of the mass analyser having a second mass shift per volt perturbation. The second mass shift per volt perturbation opposes the first mass shift per volt perturbation. The voltage divider network is connected to the voltage source, the first voltage output, and the second voltage output. The voltage divider network comprises a first resistor and a second resistor. The first resistor is configured to define the first voltage, the first resistor having a first ageing coefficient. The second resistor is configured to define the second voltage, the second resistor having a second ageing coefficient. The second ageing coefficient is selected based on the first and second mass shift per volt perturbations and the first ageing coefficient such that a first mass shift associated with the first electrode is compensated by a second mass shift associated with the second electrode.

The voltage supply of the second aspect may be of a similar construction to the voltage supply of the first aspect. Rather than selecting resistors on the basis of a temperature coefficient, the resistors are selected on the basis of an ageing coefficient. That is to say, the voltage supply of the second aspect addresses the problem of variations in resistance of resistors over time. For example, over a time period of weeks, the resistance of a given resistor under a stable temperature may vary (age). Such variation in ageing may be independent of any temperature dependence. For example, in embodiments where the temperature of the voltage supply is carefully controlled to reduce power supply drift resulting from temperature variation, power supply drift may still occur due to resistor ageing. The voltage supply of the second aspect addresses this problem by providing resistors having ageing coefficients selected to reduce the effect of resistor ageing on the mass shift of the mass analyser. It will be appreciated that the ageing coefficients of the resistors may be selected following a similar principal as described above for the first aspect.

In some embodiments, it will be appreciated the voltage supply may select first and second resistors on the basis of both temperature coefficients and ageing coefficients. As such, in some embodiments, a voltage supply may be provided which combines the first and second aspects. That is to say, in some embodiments, the first resistor has a first temperature coefficient and a first ageing coefficient, and the e second resistor has a second temperature coefficient and a second ageing coefficient. The second temperature coefficient and the second ageing coefficient may then be selected based on the first and second mass shift per volt perturbations, the first temperature coefficient, and the first ageing coefficient such that a first mass shift associated with the first electrode is compensated by a second mass shift associated with the second electrode. As such, the voltage supply may provide voltage outputs for a mass analyser which reduce or eliminate mass shifts in response to both temperature variation and also resistor ageing.

In some embodiments, the first temperature coefficient of the first resistor is different to the second temperature coefficient of the second resistor. In some embodiments, the first ageing coefficient of the first resistor is different to the second ageing coefficient of the second resistor.

In some embodiments, the first temperature coefficient of the first resistor is no greater than 50 ppm/K. In some embodiments, the second temperature coefficient of the second resistor is greater than the first temperature coefficient. As such, the first resistor is selected with a relatively low temperature coefficient to reduce the overall voltage variation per degree Kevin for the first electrode, while the second resistor may be selected with an intentionally higher temperature coefficient in order to reduce or eliminate mass shift per degree Kelvin for the mass analyser.

In some embodiments, the first ageing coefficient of the first resistor is no greater than 50 ppm/week. In some embodiments, the second ageing coefficient of the second resistor is greater than the first ageing coefficient. As such, the first resistor is selected with a relatively low ageing coefficient to reduce the overall voltage variation per week for the first electrode, while the second resistor may be selected with an intentionally higher ageing coefficient in order to reduce or eliminate mass shift per week for the mass analyser.

In some embodiments, the first electrode of the mass analyser has a first mass shift per volt perturbation of at least 0.001 ppm/mV, and the second electrode of the mass analyser has a second mass shift per volt perturbation of at least −0.001 ppm/mV. It will be appreciated that in many cases, the magnitude of the first and second mass shift per volt perturbations (i.e. the absolute values) will be different, such that the mass analyser will have an overall (resultant) mass shift per volt perturbation (either positive or negative). The voltage supplies of the first and second aspects aim to reduce this overall mass shift per volt perturbation towards zero.

In some embodiments, the first voltage output is a first DC voltage output, and/or the second voltage output is a second DC voltage output. In some embodiments, the first and/or second voltage outputs may be DC bias voltages for respective electrodes, wherein an RF voltage is superimposed on the respective DC bias voltages. In some embodiments, the first and second voltage outputs are used to define the amplitude of a respective RF voltage.

According to a third aspect of the disclosure, a mass analyser is provided. The mass analyser comprises: an ion source, an ion detector, a first electrode, a second electrode, and a voltage supply. The ion source is configured to output ions along an ion trajectory. The ion detector is configured to detect ions along the ion trajectory. The first electrode is arranged along the ion trajectory, the first electrode having a first mass shift per volt perturbation. The second electrode is arranged along the ion trajectory, the second electrode having a second mass shift per volt perturbation, wherein the second mass shift per volt perturbation opposes the first mass shift per volt perturbation. The voltage supply comprises a voltage source, a first voltage output, a second voltage output and a voltage divider network. The first voltage output is configured to provide a first voltage to the first electrode. The second voltage output is configured to provide a second voltage to the second electrode. The voltage divider network is connected to the first voltage output, the second voltage output, and the voltage source.

The voltage divider network comprises a first resistor configured to define the first voltage, the first resistor having a first temperature coefficient, and a second resistor. The second resistor is configured to define the second voltage, the second resistor having a second temperature coefficient. The second temperature coefficient is selected based on the first and second mass shift per volt perturbations and the first temperature coefficient such that a first mass shift associated with the first electrode is compensated by a second mass shift associated with the second electrode.

As such, the mass analyser of the third aspect may include a voltage supply according to the first aspect of the disclosure.

According to a fourth aspect of the disclosure, a mass analyser is provided. The mass analyser comprises: an ion source, an ion detector, a first electrode, a second electrode, and a voltage supply. The ion source is configured to output ions along an ion trajectory. The ion detector is configured to detect ions along the ion trajectory. The first electrode is arranged along the ion trajectory, the first electrode having a first mass shift per volt perturbation. The second electrode is arranged along the ion trajectory, the second electrode having a second mass shift per volt perturbation, wherein the second mass shift per volt perturbation opposes the first mass shift per volt perturbation. The voltage supply comprises a voltage source, a first voltage output, a second voltage output and a voltage divider network. The first voltage output is configured to provide a first voltage to the first electrode. The second voltage output is configured to provide a second voltage to the second electrode. The voltage divider network is connected to the first voltage output, the second voltage output, and the voltage source. The voltage divider network comprises a first resistor configured to define the first voltage, the first resistor having a first ageing coefficient, and a second resistor. The second resistor is configured to define the second voltage, the second resistor having a second ageing coefficient. The second ageing coefficient is selected based on the first and second mass shift per volt perturbations and the first temperature coefficient such that a first mass shift associated with the first electrode is compensated by a second mass shift associated with the second electrode.

As such, the mass analyser of the fourth aspect may include a voltage supply according to the second aspect of the disclosure.

It will be appreciated the in some embodiments a mass analyser may be provided with a voltage supply wherein the first and second resistors are selected in accordance with both the first and second aspects of the disclosure.

In some embodiments, the first temperature coefficient of the first resistor is different to the second temperature coefficient of the second resistor. In some embodiments, the first ageing coefficient of the first resistor is different to the second ageing coefficient of the second resistor.

In some embodiments, the mass analyser further comprises a jitter compensating electrode arranged along the ion trajectory, the compensating electrode connected to the voltage source. The jitter compensating electrode has a mass shift per volt perturbation configured to compensate a net mass shift per volt perturbation of the first and second electrodes. As such, the mass analyser may be provided with an additional electrode to counteract the effect of any jitter in the voltage source. Such voltage jitter may be independent of any variations due to temperature and/or ageing of resistors. Thus, any perturbations to the voltage provided by the voltage source which may affect the voltage divider network, are also reproduced on the jitter compensating electrode. As the jitter compensating electrode has an associated mass shift per volt which opposes the net mass shift per volt of the first and second electrodes, the jitter compensating electrode compensates for the mass shift applied to the first and second electrodes by the voltage perturbation.

While the jitter compensating electrode described above is configured to compensate for a net mass shift of the first and second electrodes of the mass analyser, it will be appreciated that in other embodiments, the jitter compensating electrode may be configured to compensate for a net mass shift of a plurality of electrodes of the mass analyser. That is to say, the jitter compensating electrode may be configured to compensate for the net mass shift of at least the electrodes with the most significant mass shift per volt perturbations. For example, the jitter compensating electrode may compensate for the at least 3 electrodes of the mass analyser with the most significant (i.e. highest) mass shift per volt perturbations. In some embodiments, the jitter compensating electrode may compensate for the at least: 5, 7, 10, 15 or 20 electrodes of the mass analyser with the most significant (i.e. highest) mass shift per volt perturbations.

The jitter compensating electrode may be an electrode arranged at a point along the ion trajectory. That is to say, the jitter compensating electrode may be provided at any point along the ion trajectory between the ion source and the ion detector. For example, the jitter compensating electrode may be arranged before the first and second electrodes, between the first and second electrodes, or after the first and second electrodes along the ion trajectory. In some embodiments, the jitter compensating electrode may interact with the ion trajectory a plurality of times. That is to say, ions travelling along the ion trajectory may pass through an electric field provided by the jitter compensating electrode a plurality of times as they travel between the ion source and the ion detector. For example, in a ToF mass analyser (or a multiple reflection ToF), the jitter compensating electrode may be provided such that an electrical field extending from the jitter compensating electrode intersects the ion trajectory a plurality of times.

In some embodiments, the jitter compensating electrode is connected to the voltage source in parallel with the voltage divider network. In some embodiments, the jitter compensating electrode is capacitively coupled to the voltage source. Thus, any perturbations to the voltage provided by the voltage source which may affect the voltage divider network, are also reproduced on the jitter compensating electrode.

In some embodiments, the mass analyser comprises a Time of Flight (ToF) mass analyser, wherein the ion detector and the first and second electrodes are provided within the ToF mass analyser. In some embodiments, the mass analyser comprises an ion mirror comprising the first and second electrodes. For example, a ToF mass analyser may be provided with an ion mirror. In some embodiments, the ToF mass analyser may be provided with a pair of opposing ion mirrors. In some embodiments, the ToF mass analyser may be a multiple reflection ToF mass analyser comprising a pair of ion mirrors. In some embodiments, the jitter compensating electrode may be provided in addition the pair of ion mirrors.

In some embodiments, the mass analyser comprises a Fourier transform mass analyser, for example an orbital trapping mass analyser or an Electrostatic Ion Trap Mass Analyser.

While the third and fourth aspects of the disclosure described above may incorporate a jitter compensating electrode in addition to the voltage supply of the first and/or second aspects, it will be appreciated that the jitter compensating electrode may, in some embodiments be provided independently of the voltage supply described above.

Thus, according to a fifth aspect of the disclosure, a mass analyser is provided. The mass analyser comprises an ion source, an ion detector, a plurality of electrodes, a jitter compensating electrode, and a voltage source. The ion source is configured to output ions along an ion trajectory. The ion detector is configured to detect ions along the ion trajectory. The plurality of electrodes are arranged along the ion trajectory. Each electrode of the plurality of electrodes has an associated mass shift per volt perturbation. The jitter compensating electrode is arranged along the ion trajectory. The jitter compensating electrode, and the plurality of electrodes are each connected to the voltage source. The jitter compensating electrode has a mass shift per volt perturbation configured to compensate a net mass shift per volt perturbation of the plurality of electrodes.

As such, according to the fifth aspect of the disclosure, a jitter compensating electrode may be provided to counteract the effects of voltage source jitter on the electrodes of a mass analyser. In particular, the jitter compensating electrode may be provided to counteract the effect of voltage source jitter of the electrodes of a mass analyser. That is to say, the plurality of electrodes to be jitter compensated may each be provided as part of a mass analyser. For example, the mass analyser may comprise a ToF, or a Fourier Transform mass analyser.

The mass analyser of the fifth aspect may incorporate any of the features described above in relation to the first though fourth aspects of the disclosure.

BRIEF DESCRIPTION OF THE FIGURES

Embodiments of the present disclosure will now be described, by way of example only, with reference to the accompanying figures in which.

DETAILED DESCRIPTION

Figure 1:
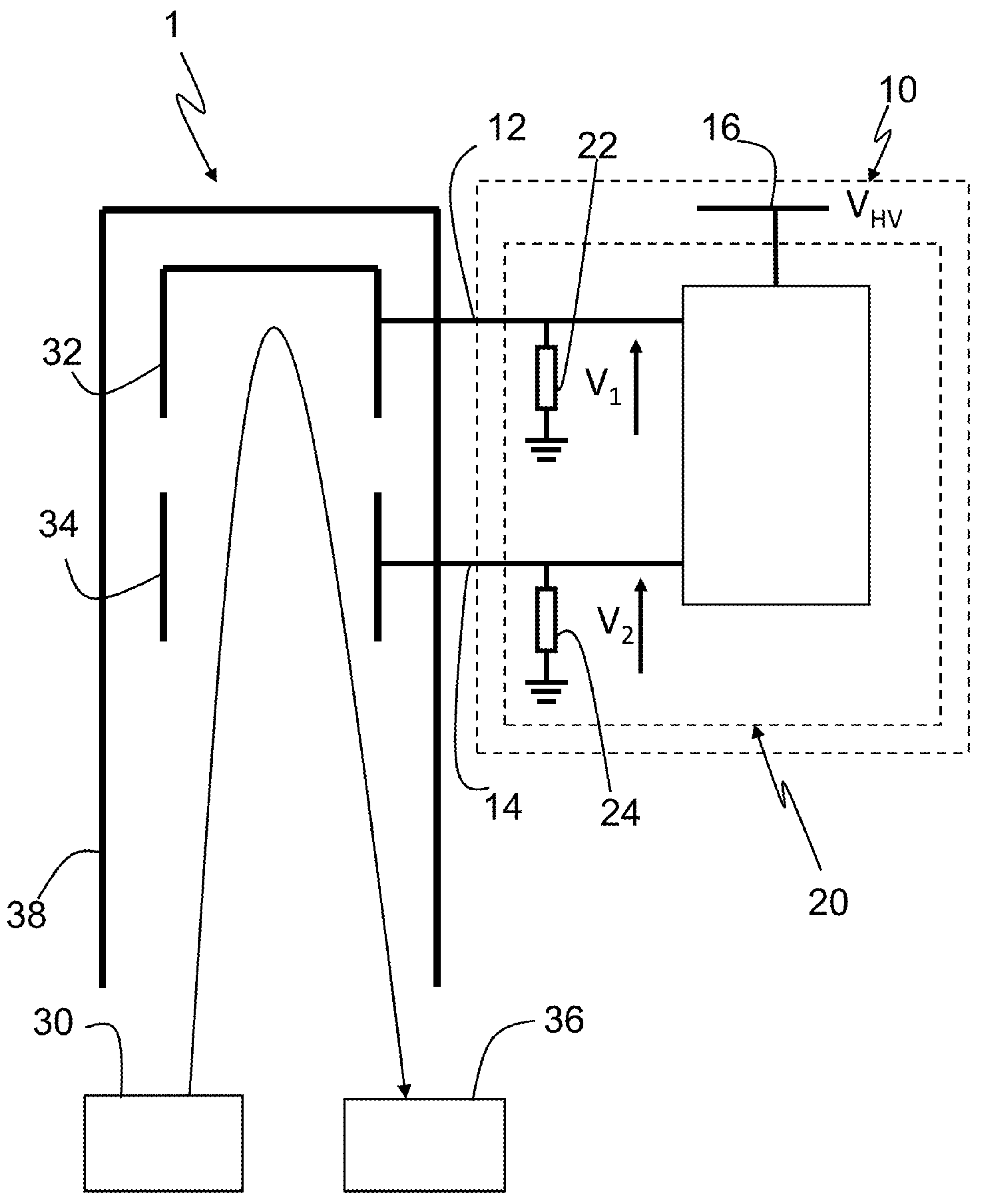
FIG. 1 shows a schematic diagram of a mass analyser and a voltage supply according to a first embodiment of the disclosure.

According to a first embodiment of the disclosure, a mass analyser is provided 1. A schematic diagram of the mass analyser 1 is shown in FIG. 1. As shown in FIG. 1, the mass analyser 1 comprises a voltage supply 10 for the mass analyser 1. As shown in FIG. 1, the voltage supply 10 comprises a first voltage output 12, a second voltage output 14, a voltage source 16, and a voltage divider network 20. The mass analyser 1 also comprises an ion source 30, a first electrode 32, a second electrode 34, and an ion detector 36.

The mass analyser 1 shown schematically in FIG. 1 is a Time of Flight (ToF) mass analyser.

While the description of the embodiment of the invention is provided in relation to the embodiment of FIG. 1, it will be appreciated that the invention may be applied to any mass spectrometer incorporating electrodes which may be subject to mass shifts resulting from power supply drift and/or jitter.

The mass analyser of FIG. 1 includes an ion source 30. The ion source is configured to output ions along an ion trajectory. The ion trajectory is shown in the schematic diagram of FIG. 1. The ion trajectory extends from the ion source 30 into a flight chamber 38 of the ToF. The first electrode 32 is arranged in the flight chamber 38 as an ion mirror. The ion mirror is configured to reflect ions back towards the entrance to the flight chamber 38, where an ion detector 36 is located. The principals of operating a ToF including one or more ion mirrors is known the skilled person, and so is not described in further detail herein.

The ion source 30 which outputs ions into the ToF may be any suitable source of ions. For example, the ion source 30 may comprise an ion trap (not shown) which accumulates ions prior to their output into the ToF. The ion trap may in turn may be connected to other ion optics components of a mass spectrometer system which are configured to generate and transport ions to the ion trap. Alternatively, the ion source may be an electrospray ion source which is configured to generate and output ions to the ToF.

In order to reflect the ions travelling along the ion trajectory back towards the ion detector 38, the first and second electrodes 32, 34 are connected to first and second voltage outputs 12, 14 respective of a voltage supply 10. The voltage supply is configured to output a first voltage ($V_1$) to the first electrode 12 and a second voltage ($V_2$) to the second electrode 14.

For the ToF mass analyser of FIG. 1, the mass of an ion is determined based on the time taken for the ion to travel from the ion source 30 to the ion detector 36. Ions with higher mass take longer to transit from the ion source 30 to ion detector 36 than ions with lower mass. The time taken depends on the mass of the ion, as well of the magnitudes of the voltages applied to the first and second electrodes 32, 34. In general, the voltages applied to the first and second electrodes 32, 34 are calibrated in advance of an analysis such that they are known (and generally held constant during an analysis). This in turn allows the mass of the ion to be inferred from the flight time. Thus, it will be appreciated that any unexpected changes to the voltages applied to the first and second electrodes 32, 34 may cause an unintended change in the flight time of the ion, and consequently an error in the determined mass of the ion.

In the embodiment of FIG. 1, the first electrode 32 acts as an ion mirror to reflect ions back towards the entrance of the ToF. For positively charged ions, a positive first voltage $V_1$ is applied to the first electrode 32. A positive perturbation to $V_1$ has the effect of increasing the repulsive potential of the first electrode, thus effectively shortening the ion flight path for an ion of a given mass (i.e. a reduction in flight time for an ion). That is to say, a positive perturbation to the first voltage $V_1$ results in a negative shift in the mass determined (relative to the mass that would be determined in the absence of the voltage perturbation). The amount of mass shift that occurs when the first voltage is perturbed can be calculated by mass analysing an ion of known mass using the mass analyser 1 under two different first voltages $V_1$ and determining the resulting mass shift (as a percentage of the known mass of the ion). Based on the mass shift and the voltage difference, a relationship between the first voltage $V_1$ applied to the first electrode and resulting mass shift may be determined. That is to say, the first electrode 32 has a first mass shift per volt perturbation $\Delta_1$ associated with it (i.e. the amount of mass shift caused by a 1 V perturbation to the voltage applied to the first electrode). For example, the first electrode 32 may have first mass shift per volt perturbation $\Delta_1$ of −0.01 ppm/mV. In such a case, a +100 mV voltage perturbation would cause a shift in the measured mass of an ion by −1 ppm (parts per million, i.e. 0.0001%). Correspondingly, a −100 mV voltage perturbation would cause a shift in the measured mass of an ion by +1 ppm.

In the embodiment of FIG. 1, the second electrode 34 can be biased to increase the time of travel of ions through the mass analyser. As such, a positive voltage perturbation applied to the second electrode results in an increase in the mass of the ion measured by the ToF. That is to say, the second electrode has a second mass shift per volt perturbation $\Delta_2$ associated with it that is opposite to that of the first electrode 32. The mass shift per volt perturbation characteristic for the second electrode 34 may be determined in a similar manner as described above for the first electrode 32. For example, the second mass shift per volt perturbation characteristic associated with the second electrode $\Delta_2$ may be +0.01 ppm/mV. As such, a voltage perturbation of 100 mV applied to the second electrode results in a +1 ppm shift in the mass measured by the mass analyser.

In order to apply the first and second voltages $V_1$, $V_2$ to the mass analyser 1, a voltage supply 10 is provided. The voltage supply 10 includes a first voltage output 12 configured to provide the first voltage $V_1$ to the first electrode 32. The voltage supply also includes a second voltage output 14 configured to provide the second voltage $V_2$ to the second electrode 34. As discussed above, the first electrode 32 has a first mass shift per volt perturbation associated $\Delta_1$ with it and the second electrode 34 has a second mass shift per volt perturbation $\Delta_2$ associated with it, wherein the second mass shift per volt perturbation opposes the first mass shift per volt perturbation (i.e. $\Delta_1$ is of the opposite sign (positive or negative) to $\Delta_2$).

As shown in FIG. 1, the voltage supply 10 comprises a voltage source 16. The voltage source 16 is a voltage source which, in combination with the voltage divider network provides the desired voltage outputs to the first and second voltage outputs 12, 14. As such, in the embodiment of FIG. 1, the voltage source 16 may be a source of DC voltage, preferably a DC voltage in excess of 1000 V. Various circuits for providing a high voltage are known to the skilled person The voltage divider network 20 is connected to the voltage source 16, the first voltage output 12, and the second voltage output 14. The voltage divider network 20 is shown schematically in FIG. 1. The voltage divider network 20 comprises a first resistor 22 and a second resistor 24. The first resistor 22 is configured to define the first voltage $V_1$ which is output to the first voltage output 12. While in FIG. 1 the first voltage $V_1$ is shown as being defined by a first resistor 22, it will be appreciated that in other embodiments, the first voltage $V_1$ may be defined by one or more first resistors. Various voltage divider network circuits for providing a DC voltage output of a desired voltage from a voltage source 16 are known to the skilled person, and so are not discussed in further details herein.

Similar to the first resistor 22, the second resistor 24 is configured to define the second voltage $V_2$. The second voltage $V_2$ may also be defined by one or more second resistors 24.

The first and second resistors have a respective temperature coefficient ($C_1$, $C_2$). The temperature coefficient for each resistor represents how much the nominal resistance of the resistor changes with temperature. Conventionally, for applications where temperature stability is of upmost importance, resistors with a low temperature coefficient would normally be chosen (i.e. resistors where the resistance change with temperature is relatively low). In embodiments of the present disclosure, the second temperature coefficient for the second resistor is selected based on the first and second mass shift per volt perturbations and the first temperature coefficient such that a first mass shift associated with the first electrode is compensated by a second mass shift associated with the second electrode. As such, resistors may be selected with different temperature coefficients in order to balance the mass shift that occurs in the mass analyser.

As an example, the first electrode 32 of the embodiment is supplied with a first voltage $V_1$ of +6000 V, while the second electrode 34 is supplied with a second voltage $V_2$ of +3000 V. The first electrode has a first mass shift per volt perturbation $\Delta_1$ of −0.01 ppm/mV associated with it. The second electrode has a second mass shift per volt perturbation $\Delta_2$ of +0.01 ppm/mV. In such an example, the first resistor 22 for selected to define the first voltage output 12 of the voltage divider network is selected with a first temperature coefficient $C_1$ of 5 ppm/K (i.e. a resistance change of 0.0005% per degree Kelvin). A relatively low temperature coefficient is selected for this resistor to minimise the overall temperature variations for the voltage supply 10.

Selecting such a first temperature coefficient results in (approximately) a variation of 30 mV in the first voltage $V_1$ per degree Kelvin increase in temperature (i.e. $\delta_{V1}=C_1*V_1$). Consequently, the first electrode has an associated mass shift ($\delta_{m1}$) of $\delta_{m1}=\Delta_1*\delta_{V1}=-0.3$ ppm/K The second resistor 22 is thus selected to balance this mass shift (i.e. $\delta_{m2}=+0.3$ ppm/K). That is to say, a second resistor is chosen to provide a voltage perturbation per degree Kelvin of $\delta_{V2}=\delta_{m2}/\Delta_2=30$ mV. For the second electrode 34, the ideal temperature coefficient for the corresponding second resistor is thus approximately $C_2=\delta_{V2}/V_2=10$ ppm/K. As such, selecting a second resistor with an intentionally higher temperature coefficient can actually provide a temperature compensating effect, by taking into account the effect of temperature induced voltage perturbation on the resulting mass shift of the mass analyser 1. It is noted that in the above example, it is assumed that a single resistor primarily defines the output voltage for each electrode 32, 34, and as such the temperature coefficient of a single resistor is used in the calculation of the mass shift associated with each voltage output.

For other voltage divider networks, the relationship between the temperature coefficient(s) of the resistor(s) and the voltage output of the voltage divider network may be different. For example, resister dividers incorporating multiple resisters may use a combination of resistors with different thermal coefficients may be selected to provide more accurate balancing of mass shifts in the mass analyser. As such, the principle of selecting the temperature coefficients of one or more of the resistors in order to compensate for a mas shift in the mass analyser may be applied to any suitable voltage supply for a mass analyser 1.

The first and second resistors 22, 24 may be selected from resistors having temperature coefficients of e.g. 1 ppm/K, 2 ppm/K, 5 ppm/K, 10 ppm/K, 20 ppm/K, 50 ppm/K, 100 ppm/K, 200 ppm/K, 500 ppm/K, 1000 ppm/K etc. In some embodiments, a resistor with the exact desired temperature coefficient may not be available, in which case a second resistor (or combination of first and second resistors) with a temperature coefficient that minimises the overall (net) mass shift may be selected.

While the above example is provided for temperature coefficients $C_1$, $C_2$ of first and second resistors 22, 24 respectively, it will be appreciated that a similar selection may also be performed for ageing coefficients ($A_1$, $A_2$) of resistors. An ageing coefficient of a resistor reflects the change in resistance over time of the resistor. Resistors may age due to repeated voltage cycling of the resistor, or due to the passage of time. One way of characterising resistor ageing is an ageing coefficient expressed in terms of parts per million resistance change per week (ppm/week), where the passage of time is the primary resistor ageing mechanism. In such embodiments, the ageing coefficients for the resistors may be selected to try to compensate for variations in mass shift of the mass analyser 1 over time. For example, for the mass analyser of FIG. 1 having parameters described above, a first resistor 22 with an ageing coefficient $A_1$ of 20 ppm/week may be selected. In such a case, a second resistor 24 with an ageing coefficient of 40 ppm/week would compensate for mass shift resulting from ageing of the first resistor.

It will also be appreciated that the first and second resistors for the first embodiment may be selected with respective ageing coefficients and temperature coefficients such that voltage supply 10 compensates for mass shifts resulting from both temperature variation and ageing variation.

While the first embodiment shown in FIG. 1 is representative of a mass analyser 1 including a first electrode 32 and a second electrode 34, it will be appreciated that other electrodes (or indeed other voltage controlled ion optics devices) may also be present that can each have an associated mass shift per volt perturbation. Each of these electrodes/devices can be compensated for using a voltage supply with suitably selected resistors.

Figure 2:
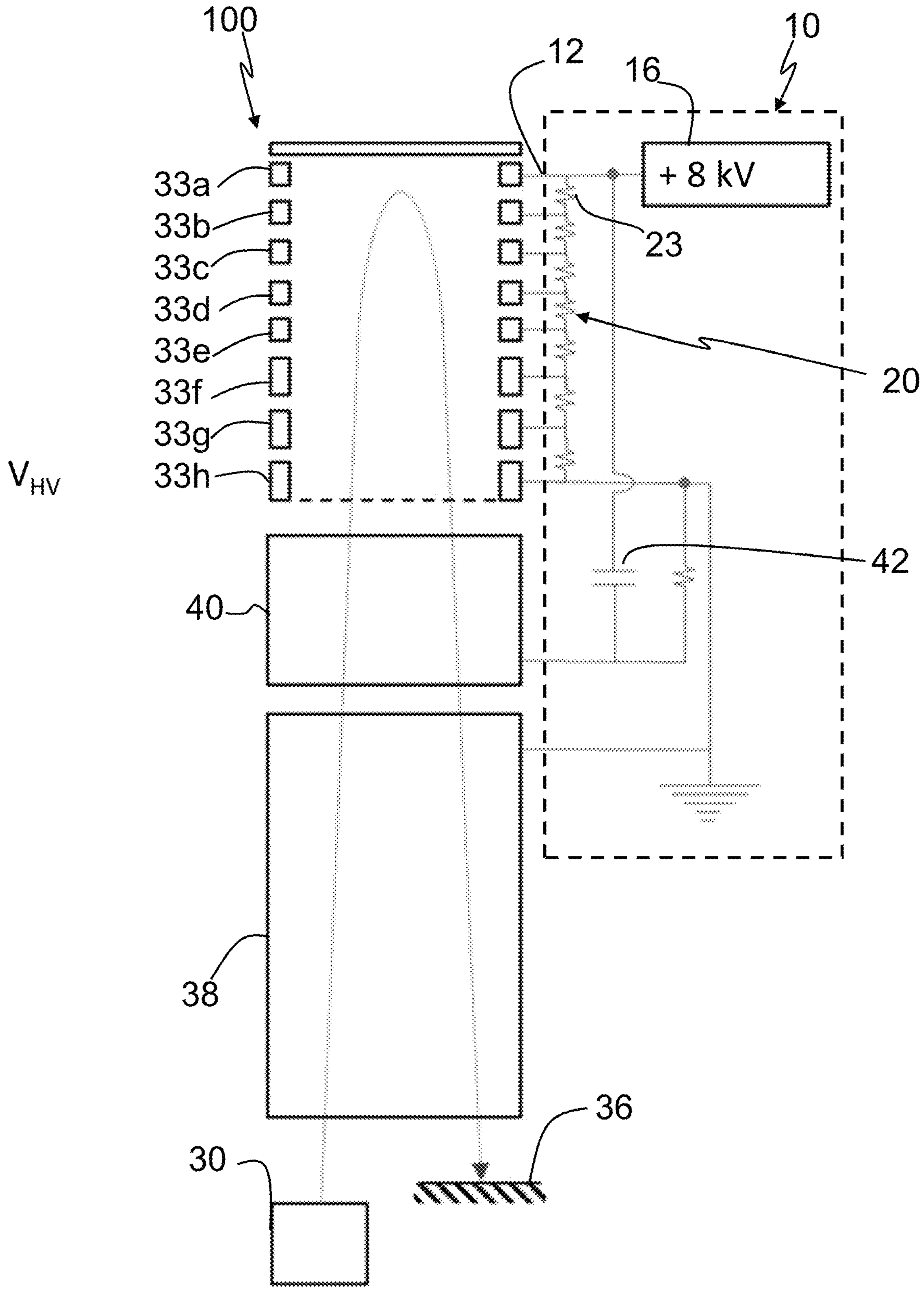
FIG. 2 shows a schematic diagram of a mass analyser according to a second embodiment of the disclosure.

As a further example, FIG. 2 shows a schematic diagram of a mass analyser 100 according to a second embodiment of the disclosure.

Similar to the first embodiment, the mass analyser 100 is a Time of Flight mass analyser. Similar components in FIG. 2 to the mass analyser 1 of FIG. 1 share the same reference numerals. As shown in FIG. 2, the mass analyser 100 includes an ion source 30, an ion detector 36, a flight tube 38, and a voltage supply 10.

The mass analyser 100 of FIG. 2 also includes a plurality of electrodes 33 (33*a*, 33*b*, 33*c*, 33*d*, 33*e*, 33*f*, 33*g*, 33*h*). The plurality of electrodes are arranged as an ion mirror, similar to the first and second electrodes 32, 34 of FIG. 1. Each of the plurality of electrodes 33 has a mass shift per volt perturbation associated with it ($\Delta_a$, $\Delta_b$, $\Delta_c$, $\Delta_d$, $\Delta_e$, $\Delta_f$, $\Delta_g$, $\Delta_h$) similar to the first and second electrodes 32, 34 of FIG. 1. The plurality of electrodes 33 are each connected to a corresponding voltage output 13*a*, 13*b*, 13*c*, 13*d*, 13*e*, 13*f*, 13*g*, 13*h* of the voltage supply 10. The voltage supply 10 incudes a voltage source 16 and a voltage divider network 20 to provide a DC voltage to each of the voltage outputs. In the embodiment of FIG. 2, the voltage source 16 is an 8 kV DC voltage source. Each of the resistors in the voltage divider network may be selected with a temperature and/or ageing coefficient in order to compensate for any mass shifts resulting from temperature or ageing variations.

As discussed above, it will be appreciated that the mass shift per volt perturbation each of the plurality of electrodes 33 may be positive or negative. Similarly, the mass shift per volt perturbation for each of the electrodes may be different. Consequently, the plurality of electrodes 33 may have an overall (net) mass shift per volt perturbation which is a sum of all the individual mass shift per volt perturbation for each of the electrodes ($\Delta_{net}=\Delta_a+\Delta_b+\Delta_c+\Delta_d+\Delta_e+\Delta_f+\Delta_g+\Delta_h$). It will be appreciated that the net mass shift per volt perturbation of the electrodes 33 may be non-zero. In such cases, any perturbation (jitter) to the voltage source 16 of the voltage supply 10 may cause a mass shift in the mass analyser. As all the electrodes 33 are connected to the same voltage source 16, the voltage perturbation (jitter) will affect all the electrodes. As such, the mass shift will be proportional to the net mass shift per volt perturbation for the electrodes 33.

To counteract the effect of voltage source jitter, the mass analyser 100 of FIG. 2 is provided with a jitter compensating electrode 40. The jitter compensating electrode 40 is arranged along the ion trajectory. As shown in FIG. 2, the jitter compensating electrode 40 is arranged between the flight tube 38 and the ion mirror. The jitter compensating electrode is provided to have an associated mass shift per volt perturbation which is opposite to the net mass shift per volt perturbation $\Delta_{net}$ of the electrodes 33. For example, the plurality of electrodes 33 in the embodiment of FIG. 2 has a $\Delta_{net}$ of −0.1 ppm/mV. Accordingly, the jitter compensating electrode 40 is provided in such a manner that is has a mass shift per volt perturbation $\Delta_{jitter}$ of +0.1 ppm/mV. By connecting the jitter compensating electrode 40 to the voltage source 16, any voltage perturbations of the voltage source 16 are experienced by the plurality of electrodes 33 and the jitter compensating electrode 40. Consequently, the mass shift from the plurality of electrodes 33 may be compensated by the mass shift of the jitter compensating electrode 40.

In the embodiment of FIG. 2, the jitter compensating electrode 40 is connected to the voltage source 16 in parallel with the voltage divider network 20. In the embodiment of FIG. 2, the jitter compensating electrode 40 is capacitively coupled to the voltage source, such that only voltage perturbations of a defined frequency range are reproduced on the jitter compensating electrode 40. In some embodiments, a coupling circuit 42 may be provided to capacitively couple the jitter compensating electrode 40 to the voltage source 16. In the embodiment of FIG. 2, the coupling circuit 42 comprises a resistor and a capacitor. As such, the resistor and the capacitor of the coupling circuit 42 can be chosen to compensate for voltage source jitter with a frequency of at least e.g. 10 Hz. In some embodiments, the coupling circuit 42 can be configured to compensate for voltage source jitter with a frequency of no greater than 30,000 Hz. In some embodiments, a coupling circuit 42 may be provided which only passes voltage supply jitter within a frequency range (i.e. a bandpass filter). Various bandpass filter circuits and other filter circuits for capacitive coupling are known to the skilled person and so are not discussed in further detail herein.

In mass analyser of FIG. 2, the most significant source of voltage jitter related errors relate to the voltage supply to the electrodes 33. As noted above $\Delta_{net}$=−0.1 ppm/mV for the electrodes. The sign of this perturbation arises because the stronger field pushes the point of reflection out towards the ion mirror entrance, effectively shortening the flight path. A positive voltage perturbation on the compensation electrode however will slow the ions that pass through, increasing the time-of-flight and giving a mass shift with the same size as the voltage perturbation.

By transmitting voltage perturbations of the voltage supply to the jitter compensating electrode 40 via capacitive coupling, then the time-of-flight perturbation will be reduced. It is important that the length of the compensation electrode as a proportion of the flight tube be tuned so that the magnitude of the perturbation is similar to that of the ion mirror. That is to say, the length of the jitter compensating electrode along the ion trajectory can be tuned/selected in order to provide the desired $\Delta_{jitter}$. Alternatively, the voltage jitter applied to the jitter compensating electrode 40 could be amplified or attenuated such that the resulting mass shift associated with the jitter compensating electrode compensates for the mass shift associated with the electrodes 33. In a relatively typical system with a short <1 m flight tube, the compensation electrode portion of the flight tube could extend along a substantial portion of the flight tube. For example, the jitter compensating electrode may extend along at least: 50%, 70%, 80%, 90%, 95% or 99% of the flight tube.

It should be noted that while the embodiment of FIG. 2 uses capacitive coupling, other means of transferring perturbations to a compensation electrode may also be suitable, for example inductive coupling. Advantageously, inductive coupling may avoid the use of capacitors (e.g. relatively large nF level HV capacitors) that may be used in capacitively coupled embodiments.

Thus, a mass analyser 100 may be provided with a jitter compensating electrode 40 to compensate for voltage supply jitter. It will be appreciated that the jitter compensating electrode may be provided independently of the voltage supply 10. That is to say, in some embodiments, a mass analyser 100 may be provided with a jitter compensating electrode and a conventional voltage supply.

While the jitter compensating electrode 40 of FIG. 2 is capacitively coupled to the voltage supply 10, it will be appreciated that in some embodiments of the disclosure, a jitter compensating electrode may be directly connected to a voltage supply, for example a high voltage supply suppling high voltages (e.g. in excess of 100 V) to one or more electrodes of the mass analyser. An example of such a jitter compensating electrode is shown in FIG. 3

While a jitter compensating electrode comprising a single plate electrode could be directly connected to a high voltage supply, such a jitter compensating electrode could complicate the design of the mass analyser overall. In particular, ion trajectories incorporating a jitter compensating electrode at the DC voltage of the voltage source (e.g. $V_{HV}$ in the embodiment of FIG. 1) may adversely affect the ion trajectory. That is to say, without careful design, the potential output by such a jitter compensating electrode may be too high for ions to pass on the ion trajectory. The jitter compensating electrode shown in FIG. 3 aims to reduce voltage penetration to the ion flight path by providing alternating high voltage electrodes with grounded electrodes. Advantageously, a jitter compensating electrode that is directly connected to the high voltage supply can be configured to compensate for power supply drift as well as temperature drift of the power supply.

Figure 3:
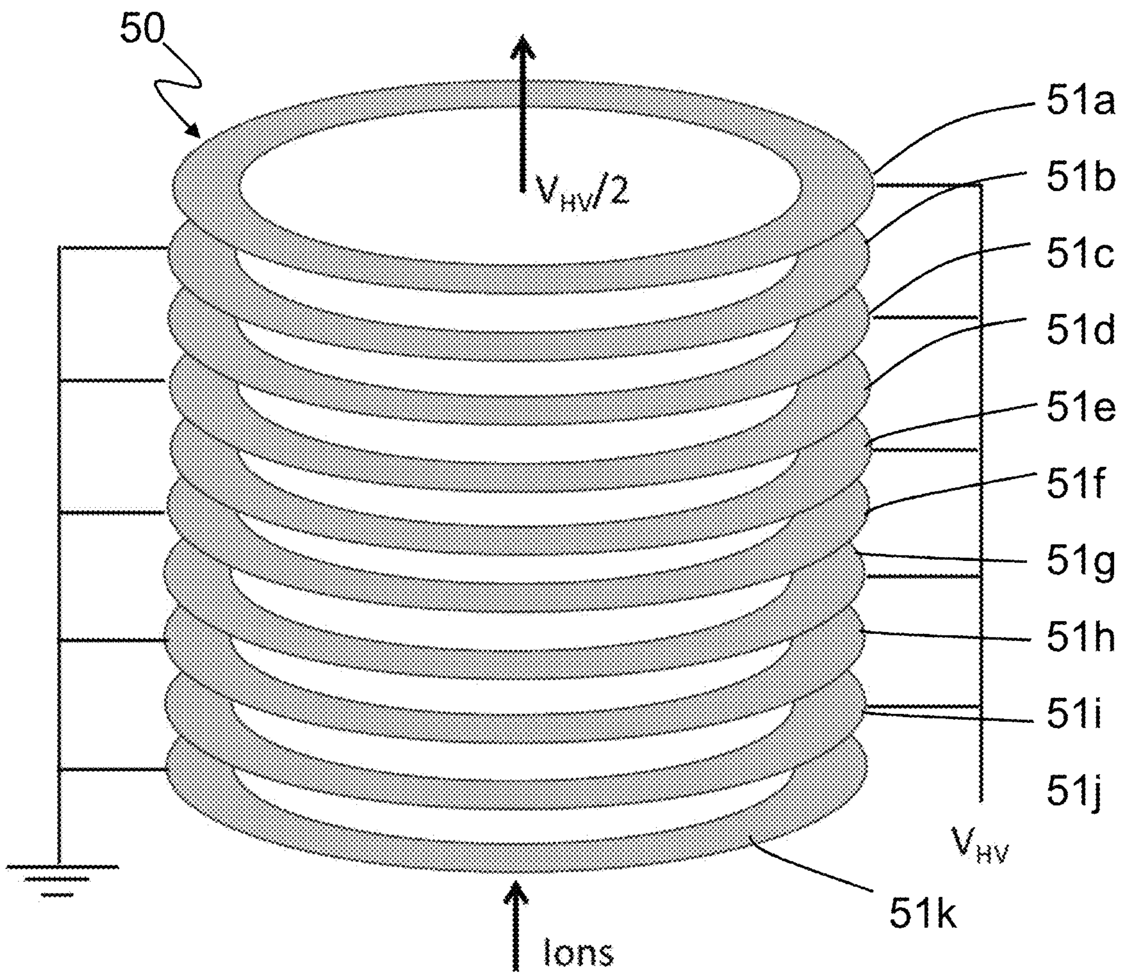
FIG. 3 shows a schematic diagram of a jitter compensating electrode.

Thus, as shown in FIG. 3, the jitter compensating electrode is a jitter compensating electrode assembly 50. The jitter compensating electrode assembly comprises a plurality of ring electrodes 51*a*, 51*b*, 51*c*, 51*d*, 51*e*, 51*f*, 51*g*, 51*h*, 51*i*, 51*j*, 51*k* which are arranged about the ion trajectory. The plurality of ring electrodes are connected to either a voltage source, or to ground in an alternating manner along the ion trajectory, where the voltage source connected to some of the plurality ring electrodes is the voltage source to be jitter compensated. As such, the jitter compensating electrode assembly 50 may be formed from a stacked ring ion guide, with suitable alternating connections to one of the voltage source and ground.

According to such a design for a jitter compensating electrode assembly 50, the potential that reaches the centre of the jitter compensating electrode assembly 50 is about half the voltage of the voltage source ($V_{HV}/2$ in FIG. 3). The voltage from the voltage source ($V_{HV}$) is attenuated by alternating electrodes at $V_{HV}$ with grounded electrodes along the ion trajectory. The voltage experienced by ions at the centre of the jitter compensating electrode assembly 50 can be further attenuated by, for example, varying the thickness, pacing or voltage application to the plates in the stack. Using such a stacked ring ion guide as a jitter compensating electrode assembly 50 can not only compensate for voltage supply jitter, but may also be provided to improve ion focusing in the mass analyser.

A further alternative jitter compensating electrode (not shown) could be formed using a cylindrical mesh surrounding the ion trajectory, wherein the voltage to be jitter compensated ($V_{HV}$) is applied to the cylindrical mesh, and surrounded by the flight potential from the ion source, so that the voltage in the centre ends up a superimposition of the two.

The embodiments of FIGS. 1 and 2 relate to ToF mass analyser 1, 100 with an ion trajectory having a single reflection. The principles of this disclosure may also be applied to multiple reflection ToF (MR-ToF) mass analysers, for example as shown in FIG. 4.

Figure 4:
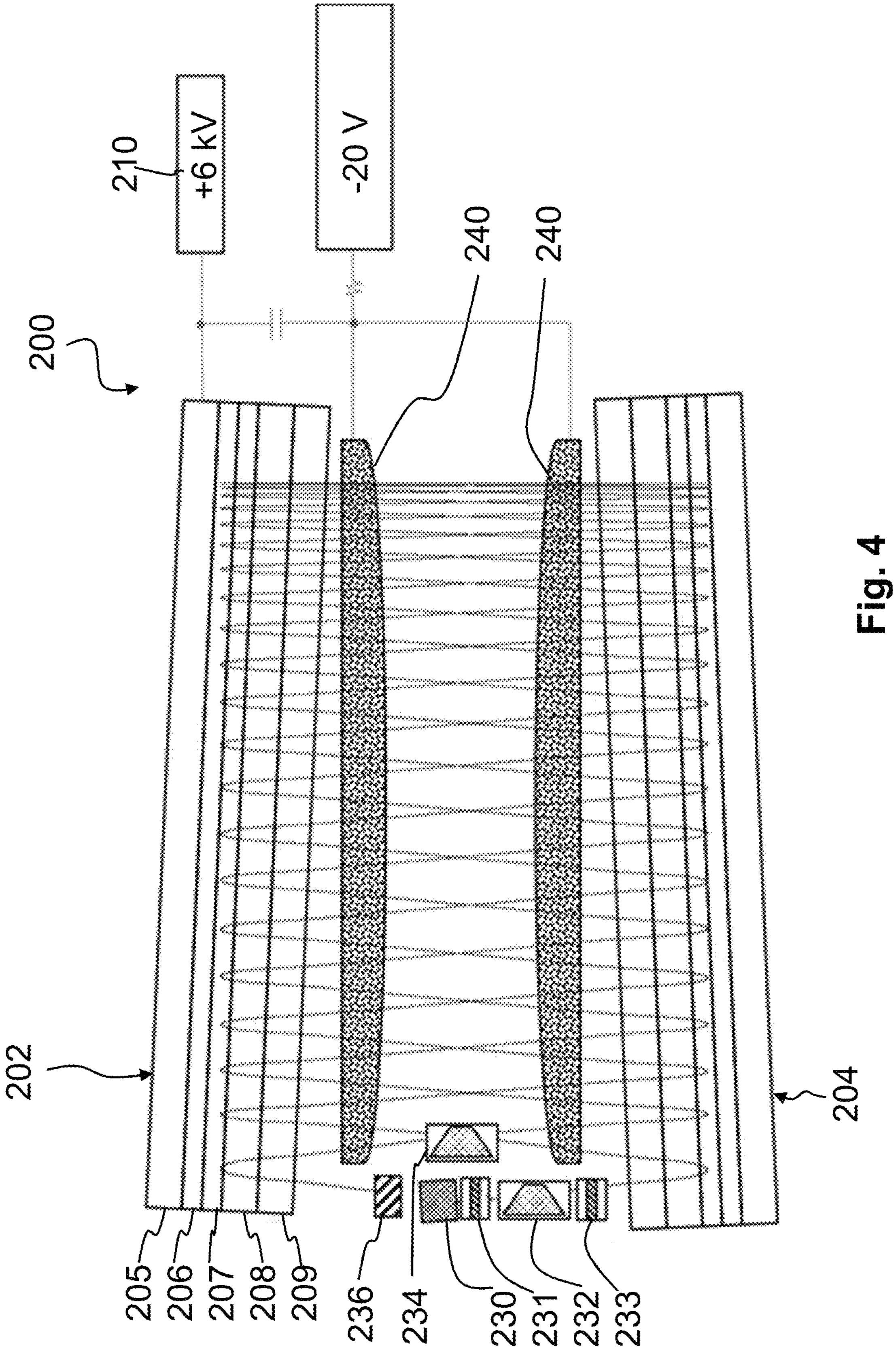
FIG. 4 shows a schematic diagram of a mass analyser according to a third embodiment of the disclosure.

FIG. 4 shows a schematic diagram of a MR-ToF 200 according to a third embodiment of the disclosure. The MR-ToF 200 comprises a first converging ion mirror 202 and a second converging ion mirror 204. The first and second converging ion mirrors 202, 204 are arranged opposite each other in order to define an ion trajectory which involves multiple reflections between the first and second converging ion mirrors 202, 204. As further shown in FIG. 4, ions are input into the MR-ToF 200 from an ion trap source 230. The ions travel from the ion trap source 230 through a first out-of-plane lens 231, a first deflector 232, a second out-of-plane-lens 233, and a second deflector 234, before travelling between the converging ion mirrors 202, 204. Ions leaving the MR-ToF 200 are captured by an ion detector 236.

In FIG. 4, the first converging ion mirror 202 comprises five mirror electrodes 205, 206, 207, 208, 209. Each of the five mirror electrodes 205, 206, 207, 208, 209 has an associated mass shift per volt perturbation ($\Delta_{m1}$, $\Delta_{m2}$, $\Delta_{m3}$, $\Delta_{m4}$, $\Delta_{m5}$). The second converging ion mirror 204 may be provided with five mirror electrodes of a similar construction.

As shown in FIG. 4, the first and second converging ion mirrors 202, 204 are each connected to a voltage supply 210. The voltage supply 210 is shown schematically in FIG. 4 as being connected to the first mirror electrode 205 of the first converging ion mirror 202.

It will be appreciated that the voltage supply 210 is connected to each of the mirror electrodes 205, 206, 207, 208, 209 in order to supply a desired DC voltage to each of the mirror electrodes. It will be appreciated that the mirror electrodes of the second converging ion mirror 204 are also each connected to a voltage supply (not shown in FIG. 4), which may be the same voltage supply 210, or a different voltage supply.

As shown in FIG. 4, a jitter compensating electrode 240 may be provided to compensate for the effects of power supply jitter. In the embodiment of FIG. 4, a pair of jitter compensating electrodes 240 are provided, one for each of the first and second converging ion mirrors 202, 204. The jitter compensating electrodes 240 are arranged between the first and second converging ion mirrors 202, 204. The jitter compensating electrodes 240 are arranged adjacent to a respective converging ion mirror 202, 204. Each jitter compensating electrode 240 is configured to compensate for a net mass shift per volt perturbation associated with a respective converging ion mirror. Various configurations for suitable jitter compensating electrodes 240 will be apparent to the skilled person based on the embodiments of this disclosure. For example, the jitter compensating electrodes 240 may be provided in a similar manner to the correction stripe electrodes as described in further detail in U.S. Pat. No. 9,136,101. In the embodiment of FIG. 4, the jitter compensating electrodes are supplied with voltage for a jitter compensating voltage source 211. The jitter compensating electrodes are capacitively coupled to the voltage supply 210 via a capacitor.

As set out in Table 1 below, the five mirror electrodes of the first converging ion mirror are to be provided with the following voltages (V) and have the following associated mass shift per volt perturbations (Δ). The voltage (V) and the associated mass shift per volt perturbations (Δ) for the jitter compensating electrode is also shown in Table 1.

TABLE 1

| Electrode | Absolute Voltage (V) | Mass shift per volt perturbation (ppm/mV) |
|---|---|---|
| First mirror electrode 205 | +6000 | −0.0935 |
| Second mirror electrode 206 | +3650 | −0.0800 |
| Third mirror electrode 207 | +4600 | +0.00704 |
| Fourth mirror electrode 208 | −7350 | +0.0235 |
| Fifth mirror electrode 209 | 0 | 0.0 |
| Jitter compensating electrode 240 | −23 | +0.0935 |

Similar to the embodiments describe above, the voltages supplied to the four mirror electrodes which receive a non-zero voltage 205, 206, 207, 208 may be defined using a voltage divider network (not shown). In such a voltage divider network, the one or more resistors that define a respective voltage for each of the four mirror electrodes 205, 206, 207, 208 may be selected such that the net effect of temperature shift and/or ageing is reduced and/or eliminated.

For example, as shown in Table 2 below, resistors with a temperature coefficient of 5 ppm/K may be selected for voltage divider network for outputting voltages for the first, second, and fourth mirror electrodes 205, 206, 208. As shown in Table 2 below, a +1 K drift in temperature would produce a net mass shift of −3.4 ppm in the MR-ToF 200. If the resistor(s) of the voltage divider network for outputting the voltage for the third mirror electrode 207 were selected using temperature coefficients of 100 ppm/K, the +1 K mass drift in temperature would produce a mass shift associated with the third electrode 207 of +3.24 ppm. As such, the temperature coefficients for the resistors of the voltage divider network may be selected to reduce the net temperature drift of mass analyser 200 to −0.26 ppm/K. As such, by intentionally using one or more resistors with a higher temperature coefficient than other resistors in the voltage divider network, the mass analyser 200 can be provided with a temperature drift of less than +/−1 ppm/K.

TABLE 2

| Electrode | Absolute Voltage, V (V) | Mass shift per volt perturbation, Δ (ppm/mV) | Temperature Coefficient, C. (ppm/K) | Voltage perturbation per degree Kelvin, $\delta_v$ (mV/K) | Mass shift per degree Kelvin (ppm/K) |
|---|---|---|---|---|---|
| First mirror electrode 205 | +6000 | −0.0935 | 5 | 30 | −2.81 |
| Second mirror electrode 206 | +3650 | −0.0800 | 5 | 18.25 | −1.46 |
| Third mirror electrode 207 | +4600 | +0.00704 | 100 | 460 | +3.24 |
| Fourth mirror electrode 208 | −7350 | +0.0235 | 5 | 36.75 | +0.863 |

As shown in Table 1, mass shift per volt perturbations associated with mirror electrodes 205 and 206 are the most significant. The net mass shift per volt perturbation ($\Delta_{net}$) for the five mirror electrodes of the first ion mirror 202 is −0.143 ppm/mV. The jitter compensating electrode 240 can be provided with an associated mass shift per volt perturbation which compensates for at least some of the overall net mass shift. As such, by providing the mass analyser 200 with the jitter compensating electrode 240, the net mass shift per volt perturbation is reduced to −0.0494 ppm/mV. Effectively, the jitter compensating electrode 240 compensates for any mass shift associated with voltage perturbations to the mirror electrode 205. Thus as shown in FIG. 4, the jitter compensating electrode 240 is capacitively coupled to the mirror electrode 205 via a capacitor. A similar capacitive coupling is used for the other jitter compensating electrode 240 and the second converging ion mirror 204 (not shown).

In addition to the jitter compensation, the MR-TOF 200 may also be provided with a voltage supply 210 which is configured to reduce power supply drift (temperature drift and/or ageing drift) for the mirror electrodes 205, 206, 207, 208, 209 of the converging ion mirrors 202, 204.

While the above table relates to the resistors of the voltage supply 210 for the converging ion mirrors 202, 204, it will be appreciated that the principle of the resistor selection may also be applied to the voltage supply for any other component of the mass analyser 200 wherein a voltage perturbation can result in a mass shift in the detected mass of an ion. For example, the same principle may be applied to the voltage supply for one or more of: a voltage of the ion trap source 230, the first out-of-plane lens 231, the first deflector 232, the second out-of-plane-lens 233, and the second deflector 234.

While the above discussion of FIG. 4 relates to the selection of resistors having a desired temperature coefficient, it will be appreciated that the same principles may also be applied to the selection of resistors having a desired ageing coefficient in order to reduce or eliminate the effect of age-related drift on the mass analyser 200.

While the embodiments of FIGS. 1, 2, and 4 relate to ToF mass analysers, it will be appreciated that the present disclosure is not limited to ToF mass analyser. For example, embodiments of the disclosure include voltage supplies for other types of mass analysers, such as ion trap mass analysers or Fourier Transform mass analyser.

Figure 5:
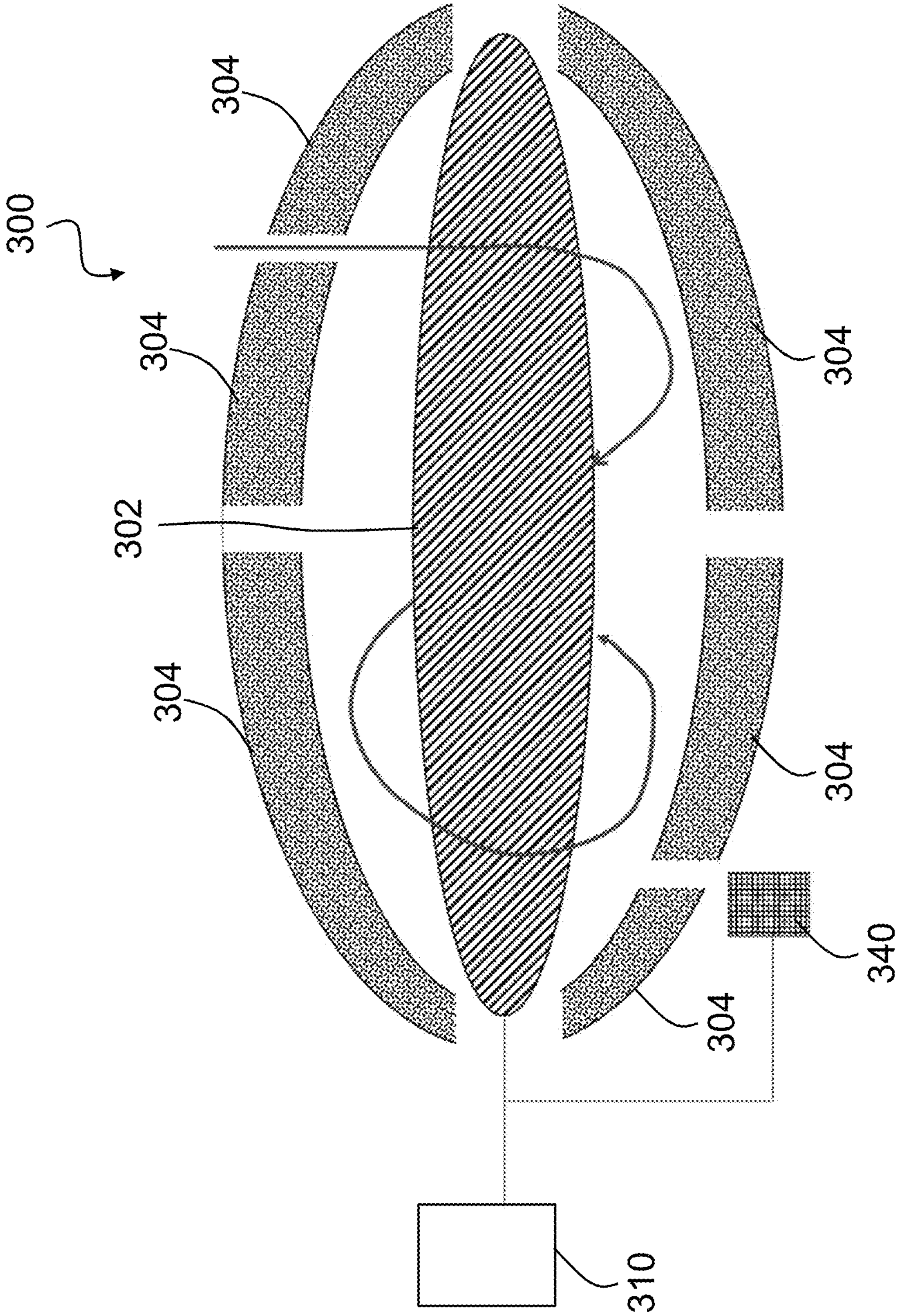
FIG. 5 shows a schematic diagram of a mass analyser according to a fourth embodiment of the disclosure.

According to a fourth embodiment, FIG. 5 shows a schematic diagram of a Fourier transform mass analyser. The Fourier transform mass analyser of FIG. 5 is an orbital trapping mass analyser 300. The orbital trapping mass analyser may be provided, for example, as substantially described in U.S. Pat. No. 8,841,604. The orbital trapping mass analyser 300 comprises an inner electrode 302 and a plurality of outer shell electrodes 504. A voltage supply 310 is connected to the inner electrode 302, while the outer electrodes 304 are used for detecting the ion current orbiting the inner electrodes. As shown in FIG. 5, a jitter compensating electrode 340 could be provided adjacent to one or more of the outer electrodes 304. For example, as shown in FIG. 5, the jitter compensating electrode could be provided in a slot provided in one of the outer electrodes 304. The jitter compensating electrode 540 could be directly, or capacitively coupled to the voltage supply 310, wherein the jitter compensating electrode is configured to compensate for voltage jitter on the inner electrode 302. In some embodiments, the voltage supply could also be configured to include a voltage divider network (not shown) to provide voltages to the inner electrode 302 and the jitter compensating electrode 340. In such an embodiment, the voltage divider network may include resistors which are selected to reduce thermal drift and/or ageing drift of the voltage supply 310 in accordance with the embodiments described above.

Thus, in accordance with embodiments of the disclosure, the mass shift associated with voltages applied to components (e.g. electrodes) of a mass analyser can be used to configure the mass analyser to reduce or eliminate the effects of power supply draft and/or power supply jitter. Such principles can be used to provide a mass analyser with high stability (e.g. thermal stability lower than 1 ppm/K), such that high accuracy measurement may be performed using the mass analyser. In particular, a voltage supply for a mass analyser may be provided according to the embodiments described above.

Although embodiments of the invention have been described in detail herein, it will be understood by those skilled in the art that variations to these embodiments may be made without departing from the scope of the invention or the appended claims.

The invention claimed is:

1. A voltage supply for a mass analyser comprising:

a voltage source;

a first voltage output configured to provide a first voltage to a first electrode of the mass analyser, the first electrode of the mass analyser having a first mass shift per volt perturbation;

a second voltage output configured to provide a second voltage to a second electrode of the mass analyser, the second electrode of the mass analyser having a second mass shift per volt perturbation, wherein the second mass shift per volt perturbation opposes the first mass shift per volt perturbation; and a voltage divider network connected to the voltage source, the first voltage output, and the second voltage output, the voltage divider network comprising:

a first resistor configured to define the first voltage, the first resistor having a first temperature coefficient; and a second resistor configured to define the second voltage, the second resistor having a second temperature coefficient, wherein the second temperature coefficient is selected based on the first and second mass shift per volt perturbations and the first temperature coefficient such that a first mass shift associated with the first electrode is compensated by a second mass shift associated with the second electrode.

2. A voltage supply according to claim 1, wherein the first temperature coefficient of the first resistor is different to the second temperature coefficient of the second resistor.

3. A voltage supply according to claim 1, wherein the first resistor has a first ageing coefficient, and the second resistor has a second ageing coefficient, wherein the second temperature coefficient and the second ageing coefficient are selected based on the first and second mass shift per volt perturbations, the first temperature coefficient, and the first ageing coefficient such that a first mass shift associated with the first electrode is compensated by a second mass shift associated with the second electrode.

4. A voltage supply according to claim 1, wherein the first temperature coefficient of the first resistor is no greater than 50 ppm/K.

5. A voltage supply according to claim 1, wherein the first electrode of the mass analyser has a first mass shift per volt perturbation of at least 0.001 ppm/mV; and the second electrode of the mass analyser has a second mass shift per volt perturbation of at least −0.001 ppm/mV.

6. A voltage supply according to claim 1, wherein the first voltage output is a first DC voltage output; and the second voltage output is a second DC voltage output.

7. A voltage supply for a mass analyser comprising a voltage source;

a first voltage output configured to provide a first voltage to a first electrode of the mass analyser, the first electrode of the mass analyser having a first mass shift per volt perturbation;

a second voltage output configured to provide a second voltage to a second electrode of the mass analyser, the second electrode of the mass analyser having a second mass shift per volt perturbation, wherein the second mass shift per volt perturbation opposes the first mass shift per volt perturbation; and a voltage divider network connected to the first voltage output, the second voltage output and the voltage source, the voltage divider network comprising:

a first resistor configured to define the first voltage, the first resistor having a first ageing coefficient; and a second resistor configured to define the second voltage, the second resistor having a second ageing coefficient, wherein the second ageing coefficient is selected based on the first and second mass shift per volt perturbations and the first ageing coefficient such that a first mass shift associated with the first electrode is compensated by a second mass shift associated with the second electrode.

8. A voltage supply according to claim 7, wherein the first ageing coefficient of the first resistor is different to the second ageing coefficient of the second resistor.

9. A voltage supply according to claim 7, wherein the first resistor has a first temperature coefficient and the second resistor has a second temperature coefficient, wherein the second temperature coefficient and the second ageing coefficient are selected based on the first and second mass shift per volt perturbations, the first temperature coefficient, and the first ageing coefficient such that a first mass shift associated with the first electrode is compensated by a second mass shift associated with the second electrode.

10. A voltage supply according to claim 7, wherein
the first ageing coefficient of the first resistor is no greater than 50 ppm/week.

11. A voltage supply according to claim 7, wherein
the first electrode of the mass analyser has a first mass shift per volt perturbation of at least 0.001 ppm/mV; and
the second electrode of the mass analyser has a second mass shift per volt perturbation of at least −0.001 ppm/mV.

12. A voltage supply according to claim 7, wherein
the first voltage output is a first DC voltage output; and
the second voltage output is a second DC voltage output.

13. A mass analyser comprising:
an ion source configured to output ions along an ion trajectory;
an ion detector configured to detect ions along the ion trajectory;
a first electrode arranged along the ion trajectory, the first electrode having a first mass shift per volt perturbation;
a second electrode arranged along the ion trajectory, the second electrode having a second mass shift per volt perturbation, wherein the second mass shift per volt perturbation opposes the first mass shift per volt perturbation; and
a voltage supply comprising:
a voltage source;
a first voltage output configured to provide a first voltage to the first electrode;
a second voltage output configured to provide a second voltage to the second electrode; and
a voltage divider network connected to the first voltage output, the second voltage output, and the voltage source, the voltage divider network comprising:
a first resistor configured to define the first voltage, the first resistor having a first temperature coefficient; and
a second resistor configured to define the second voltage, the second resistor having a second temperature coefficient, wherein the second temperature coefficient is selected based on the first and second mass shift per volt perturbations and the first temperature coefficient such that a first mass shift associated with the first electrode is compensated by a second mass shift associated with the second electrode.

14. A mass analyser according to claim 13, wherein
the first temperature coefficient of the first resistor is different to the second temperature coefficient of the second resistor.

15. A mass analyser according to claim 13, further comprising
a jitter compensating electrode arranged along the ion trajectory, the compensating electrode connected to the voltage source;
wherein the jitter compensating electrode has a mass shift per volt perturbation configured to compensate a net mass shift per volt perturbation of the first and second electrodes.

16. A mass analyser according to claim 15, wherein
the jitter compensating electrode is connected to the voltage source in parallel with the voltage divider network.

17. A mass analyser according to claim 13, wherein
the mass analyser comprises a Time of Flight (ToF) mass analyser, wherein the ion detector and the first and second electrodes are provided within the ToF mass analyser.

18. A mass analyser according to claim 13, wherein
the mass analyser comprises an ion mirror comprising the first and second electrodes.

19. A mass analyser according to claim 13, wherein
the mass analyser comprises an orbital trapping mass analyser.

20. A mass analyser comprising:
an ion source configured to output ions along an ion trajectory;
an ion detector configured to detect ions along the ion trajectory;
a first electrode arranged along the ion trajectory, the first electrode having a first mass shift per volt perturbation;
a second electrode arranged along the ion trajectory, the second electrode having a second mass shift per volt perturbation, wherein the second mass shift per volt perturbation opposes the first mass shift per volt perturbation; and
a voltage supply comprising:
a voltage source;
a first voltage output configured to provide a first voltage to the first electrode;
a second voltage output configured to provide a second voltage to the second electrode; and
a voltage divider network connected to the first voltage output, the second voltage output, and the voltage source, the voltage divider network comprising:
a first resistor configured to define the first voltage, the first resistor having a first ageing coefficient; and
a second resistor configured to define the second voltage, the second resistor having a second ageing coefficient, wherein the second ageing coefficient is selected based on the first and second mass shift per volt perturbations and the first ageing coefficient such that a first mass shift associated with the first electrode is compensated by a second mass shift associated with the second electrode.

* * * * *